Sept. 6, 1932.  W. G. COUHIG  1,875,708
METHOD AND MEANS FOR SEALING THREADED PIPE JOINTS
Filed Jan. 28, 1930
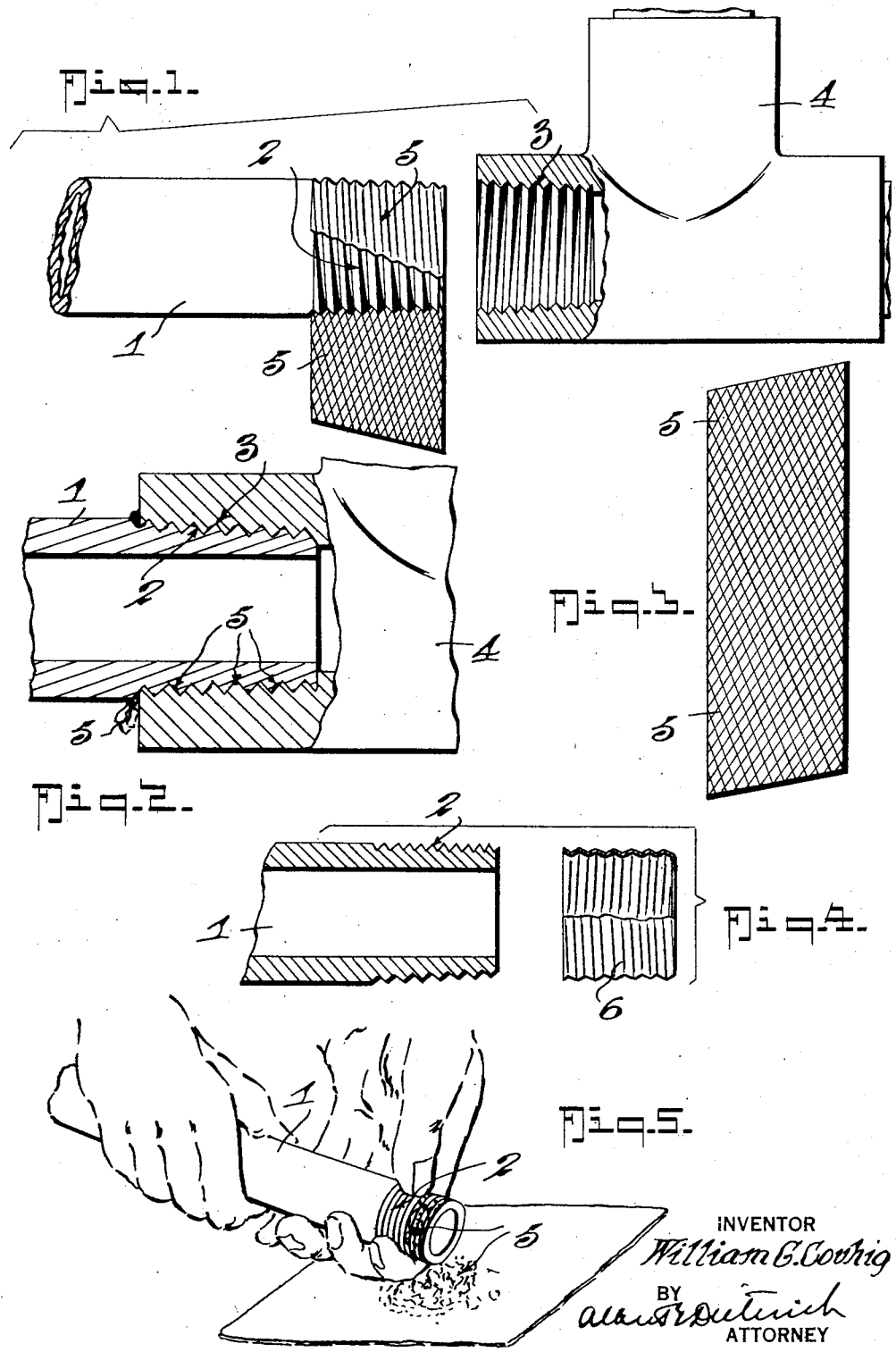
INVENTOR
William G. Couhig
BY
ATTORNEY Patented Sept. 6, 1932

1,875,708

UNITED STATES PATENT OFFICE

WILLIAM G. COUHIG, OF PAINESVILLE, OHIO

METHOD AND MEANS FOR SEALING THREADED PIPE JOINTS

Application filed January 28, 1930. Serial No. 424,036.

My invention has for an object the provision of a simple, inexpensive and easily practised method and means for rendering the threaded joints of pipes liquid, steam, and gas-tight without the necessity of employing joint cement, "dope", paint or paste as in the present general practice.

Generically, the invention resides in providing a sealing substance in the form of a thin thread strip sheet or ribbon which may be applied to the male thread without the use of a brush or applicator tool.

Further, the invention has for an object to provide a means of the character stated which will fill in all inequalities and imperfections of the thread, and will be of such character that excess material will be automatically cut off or eliminated from the joint by the simple act of assembling the two parts of the joint.

Further, it is an object to provide a sealing compound embodied in sheet or strip form such, for example, as a band or ribbon of suitable material impregnated with a suitable composition that will effect the sealing of the joint in such manner that it will not leak regardless of the specific use to which the pipe is put, i. e., a compound whose sealing properties will not be effected by heat or cold, by acids or alkali, and one which will not require any change in the present method of threading the pipes and couplings, and will not only provide a leak-proof joint but will leave the connection just as rigid a one as is obtained under present general practice.

Further, it is an object of the invention to provide a method and means for sealing threaded pipe joints without causing the joint to stick together (as where white lead, paste, or paint compositions are employed) thus enabling the joints to be unscrewed for repairs or replacements, etc. with facility.

Under the present practice generally employed today, it often happens that the screwed joint is so tightly stuck together by the "dope" used in sealing and by corrosion that its separation becomes exceedingly difficult, if not, in some cases, impossible.

Again, it is an object of the invention to provide a sealing substance in flexible tape form that may be manufactured and carried in rolled ribbon form or which may be marketed in definite lengths in packs.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing, in which:—

Figure 1 is a side elevation of a threaded pipe and coupling with a strip of sealing tape being wound over the male thread.

Figure 2 shows the joint screwed together and the excess material expelled and ready to fall off or be taken off.

Figure 3 is a detail plan view of a single strip section of sealing material.

Figure 4 is a detail elevation and part section of a threaded pipe end about to receive a "cap" of sealing material.

Figure 5 is a perspective view showing how the ground in sealing substance may be removed from the threads upon again separating the joint.

In the drawing in which like numerals of reference indicate like parts in all of the figures, 1 represents the pipe having the male thread 2 designed to fit into the corresponding female thread 3 of the coupling 4. These threads as to pitch and diameter, etc., are made in the usual way since my invention requires no departure from the present sizes and methods of pipe threading.

In the preferred embodiment of my invention, I provide a threaded ribbon or strip of woven fabric and impregnate the same with a composition consisting, preferably, of a mixture of asphaltum, graphite, soap and a lubricating oil. Such mixture may be obtained as follows:

| | Part by volume |
|---|---|
| Asphaltum | 1 |
| Graphite | ½ |
| Soap (soft) | 2 |
| Lubricating oil | ¼ |

These ingredients are well mixed together and while in the fluid state, the thread, tape or ribbon is saturated with the mixture and then dried. The ribbon, strip, etc. of material should be sufficiently thin so as to permit the tight and complete securing together of the joint and preferably thin enough to be disintegrated in the act of assembling the joint so that its substance may be ground into the breaks, unevennesses or defects in the threads and plug or fill the same against leakage of the medium which passes through the pipes.

In some cases the material may be molded into the form of a thin threaded cap or sleeve 6 and screwed onto the male thread or into the female thread. When the material is to be molded it should be thoroughly dried or hardened sufficiently to be form-sustaining.

Instead of using the impregnated fabric, a strip or band of suitable metal or metal alloy may, in some cases, be used so long as it is thin enough not to interfere with the screwing together of the pipe and coupling when the same are made according to the present commonly accepted practices.

By using my invention it has been found that upon screwing the pipe and coupling sections together, the sealing substance 7 is ground into the irregularities of the threads and forms such a tight seal as to withstand enormous pressures without leaking.

In using the preferred embodiment of my invention, I take a strip of impregnated fabric, cut it to suitable length, and wind it snugly over the male threads, see Figure 1, and into the valleys thereof and then assemble the joint in the ordinary way. The excess material will be automatically severed from that which has functioned (see Figure 2) and will drop off or it may be conveniently removed by hand.

In this way the joint is more rigid than under the old practice and while it is absolutely leak-proof at all temperatures and pressures for which the pipe was designed and regardless of the kind of fluid or fluids passing through the pipe, nevertheless the joint can be separated by the simple act of unscrewing when it becomes necessary or desirable to separate the joint.

From the foregoing description, taken in connection with the accompanying drawing, it is thought that my invention will be clear to those skilled in the art to which it relates.

What I claim is:

1. As a new article of manufacture, a pipe joint sealing ribbon comprising a base of thin flexible fabric impregnated with a sealing substance that is not destroyed by heat and moisture when in use.

2. As a new article of manufacture, a pipe joint sealing ribbon comprising a base of thin flexible fabric impregnated with a sealing substance, comprising a mixture of asphaltum, graphite, soap and lubricating oils.

3. As a new article of manufacture, a pipe joint sealing ribbon comprising a base of thin flexible fabric impregnated with a sealing substance, comprising a mixture of asphaltum, graphite, soap and lubricating oils, in substantially the proportions as follows to-wit: asphaltum 1 part by volume, graphite ½ part by volume, soap 2 parts by volume, lubricating oil ¼ part by volume.

4. The method of sealing rigid threaded pipe joints, which consists in providing the pipe elements with male and female threads of approximately the same diameters, placing a preformed thin flexible band of sealing substance over the threaded end of one joint element and then screwing the joint elements together in a manner to grind the sealing substance into any depressions and irregularities of the threads to fill the same for the purposes described.

5. The method of sealing rigid pipe joints of the kind having male and female threads which consists in providing the joints with threads of approximately the same diameters, winding a flexible strip or band of sealing substance over the male threads of one pipe joint element, and then screwing the elements together in a manner to disintegrate the band and compact the sealing substance into any depressions and irregularities of the threads to fill the same for the purposes described.

6. A pipe joint comprising male and female elements having engaging threads of approximately the same diameters, means comprising a thin strip impregnated with a sealing material that is not destroyed by heat or moisture when in use and adapted to be ground up between the mating threads of the two elements to fill any depressions or irregularities of the threads.

7. A pipe joint comprising male and female elements having engaging threads of approximately the same diameters, and means comprising a thin band of sealing material that is not destroyed by heat or moisture when in use and adapted to be ground up between the mating threads of the two elements to fill any depressions or irregularities of the threads.

WILLIAM G. COUHIG.